(12) United States Patent
Grummert et al.

(10) Patent No.: US 6,368,505 B1
(45) Date of Patent: Apr. 9, 2002

(54) CROSS-FLOW FILTER CARTRIDGE

(75) Inventors: Ulrich Grummert, Göttingen; Hans Weddo-Schmidt, Hardegsen, both of (DE)

(73) Assignee: Sartorius AG (DE)

( * ) Notice: Subject to any disclaimer, the term of this patent is extended or adjusted under 35 U.S.C. 154(b) by 0 days.

(21) Appl. No.: 09/762,322

(22) PCT Filed: Jun. 5, 1999

(86) PCT No.: PCT/EP99/03897

§ 371 Date: Apr. 20, 2001

§ 102(e) Date: Apr. 20, 2001

(87) PCT Pub. No.: WO99/67012

PCT Pub. Date: Dec. 29, 1999

(30) Foreign Application Priority Data

Jun. 19, 1998 (DE) .......................................... 198 27 473

(51) Int. Cl.[7] .......................... B01D 63/08; B01D 61/18
(52) U.S. Cl. .................. 210/321.84; 210/231; 210/232; 210/321.6; 210/321.64; 210/455; 210/456
(58) Field of Search ................................ 210/231, 232, 210/321.6, 321.84, 321.64, 455, 456

(56) References Cited

U.S. PATENT DOCUMENTS 4,715,955 A * 12/1987 Freidman ..................... 210/346

FOREIGN PATENT DOCUMENTS

| DE | 3341262 | * | 5/1985 |
| DE | 4432627 | * | 3/1996 |
| EP | 345209 | * | 12/1989 |
| WO | WO 96/28240 | * | 9/1996 |

* cited by examiner

Primary Examiner—John Kim
(74) Attorney, Agent, or Firm—Chernoff, Vilhauer, McClung & Stenzel, LLP

(57) ABSTRACT

The invention relates to improved cross-flow filter cassettes for the filtration of liquid media, which are used in cross-flow filtration devices of varying pump outputs and can be fitted with non-reinforced membranes. The cassettes comprise at least one retentate separator in which the inlets to the open perforations designed to form one type of channel, for example for retentate discharge, are larger than the inlets to the open perforations designed to form another type of channel, for example for fluid feed. In comparison with known cross-flow filter cassettes, the cross-flow filter cassettes of the invention allow retentate flows required to achieve equal filtration output at equal pressure differential on the retentate side at least 1.8 times lower. This significantly reduces the energy input required for pumping to conduct cross-flow filtration.

7 Claims, 5 Drawing Sheets

CROSS-FLOW FILTER CARTRIDGE

Pursuant to 35 USC §§371 and 365(b) the priority of Application Nos. PCT/EP 99/03897 filed Jun. 5, 1999 and DE 198 27 4734 filed Jun. 19, 1998 is claimed.

BACKGROUND OF THE INVENTION

Cross-flow filtration is generally performed with cassette filtration systems wherein several filter cassettes are arranged sequentially as a unit, being pressed between mounting plates that are sealed with sealants in their peripheral edge regions so as to be fluid-tight. The mounting plates are constructed as leading or trailing end plates with corresponding ports and distributors in channels for feed intake, retentate discharge and permeate discharge. See, for example, WO 96/28240 and EP 0 345 209. If the sealants in the peripheral edge regions involve hard-setting compounds such as polypropylene, the filter cassettes are rendered fluid-tight by using elastomeric sealants. With permanently elastic sealing compounds such as silicone, fluid-tight mounting is achieved without the need for additional sealants. In cross-flow filtration, the fluid to be filtered is fed through the leading end plate and the corresponding channels into the feed channel of the filter cassettes for the fluid to be filtered. It flows along the permselective membrane surfaces and exits the cassette as retentate. Some of it passes through the permselective membranes of the cassette and is discharged from the system through corresponding channels and the trailing end plate as permeate. Fluid flows and transmembrane and internal pressures are regulated by pumps and valves. For optimal operation of crossflow filtration systems of this kind, pumps must be adjusted to the configuration of the filter cassettes and in particular to the size of the feed channel opening. Transmembrane pressures and fluxes required for efficient filtration must not be reached or exceeded.

Cross-flow filter cassettes are known and disclosed in, for example, U.S. Pat. No. 4,715,955 and DE 34 41 349. Such cassettes are constructed of a multiplicity of adjacent filter cells, each cell consisting of alternating flat sheet membranes straddled by flat screen members, retentate spacers to form flow channels for the fluid to be filtered, and filtrate spacers to form filtrate-collection channels. Screen members and membranes have axially aligned holes, preferably running perpendicular to their surfaces, to form channels for fluid feed intake, retentate discharge and filtrate discharge.

To protect the membranes from potential mechanical damage in the transition region of the sealant potentially arising from the membrane being pressed on or into the retentate and filtrate spacers too firmly, textile-reinforced membranes are often used, wherein which one or both membrane surfaces are covered by a textile reinforcement such as a fiber fleece. However, such textile-reinforced membranes generally have a reduced flux relative to non-reinforced membranes, thereby lowering their filtering capacity. As an alternative, DE 34 41 249 recommends that additional protective ring masks and protective frames be included between the screen members. In addition to protection of the non-reinforced membranes from mechanical damage achieved thereby, this causes the flow channel for the fluid to be filtered to be expanded in size, forming a so-called "wide-channel" module. By varying the thickness of the protective ring masks and protective frames, the size of the flow channel can be set within certain limits. While the provision of such ring masks and frames provides a number of advantages such as good strength, lower mechanical loads on the membranes, and the ability to filter viscous media, at the same time it has the disadvantage that with the expanded flow channel, the flow-through rates required for optimal filtration of the fluid to be filtered through the membrane surfaces can be achieved only by exceptionally high fluxes. As a consequence systems equipped with filter cassettes of this kind have a high energy demand. Moreover, such cassettes do not achieve optimal performance in systems equipped with lower pumping capacity.

The use of filter cassettes that have no expanded flow channel such as in a so-called "narrow-channel" module, does have the advantage that high fluxes can be readily achieved with low pumping capacity, but at the same time has the disadvantages of being restricted to the use of thinner spacers with consequent higher mechanical loads on the membranes and reduced membrane surface area available for filtration. By using finer fabrics as spacers, the number of non-filtering points where the reinforcing fabric fibers are applied to the membrane is increased in comparison to thick, coarse fabrics or filter cassettes with built-in protective ring masks and protective frames. In addition, filter cassettes of this type exhibit low permeability to particles and poor filtration of viscous media.

It is therefore a principal object of the present invention to provide improved filter cassettes that can be operated in cross-flow filtration systems having a wide variety of pumping capacities. A related object of the invention is the provision of improved cross-flow filter cassettes that can be operated even when equipped with non-reinforced membranes as in the case of a narrow-channel module.

BRIEF SUMMARY OF THE INVENTION

The cross-flow filter cassettes according to the present invention are characterized by the fact that they have at least one retentate spacer in which the inlets to the open holes forming one type of channel such as a retentate discharge channel are larger than the inlets to the open holes forming a second type of channel such as the feed inlet channel. If the cross-flow filter cassettes are connected to the leading and/or trailing end plates in such a way that greater access to the open holes of the retentate spacers is formed by the channels for the fluid flow, a pressure drop arises in the other longitudinal flow channels which have equal access to the open holes to the channels for the fluid intake and retentate outflow. Due to this higher pressure level in a given longitudinal flow channel across the retentate spacer, that longitudinal flow channel expands and exerts a force on adjacent flat sheet membranes, which in turn expands other longitudinal flow channels, thereby increasing flux for a given feed pressure. Alternatively with equal fluxes, this leads to a lower amount of fluid feed having to be pumped through the filter cassette per unit of time.

In an alternative embodiment of the invention, the membranes are covered in their edge regions by protective frames that leave the holes open or in the region of their holes by protective ring masks that leave the holes open. This permits mechanically fragile non-reinforced membranes to be installed in the filter cassettes, but at the same time it leads to expansion of the longitudinal flow channels, requiring greater pumping capacity, in order to achieve optimal flow through the membranes. But this negative effect is overcome by the invention whereby the longitudinal flow channels flow are narrowed.

With the cross-flow filter cassettes according to the invention, fluids are filtered such as liquids, emulsions, suspensions, foods, and drinks such as beer, beer seasonings, wine, juice, water, mineral water, and milk; drinking, process, and waste water; and solutions in pharmaceuticals, medicines, cosmetics, chemistry, biotechnology, gene technology, electronics, environmental protection, and laboratories. They can be used to separate materials, to disinfect and sterilize solutions, and to remove pollutants from fluids, for filtration and concentration of biological solutions, to separate microorganisms such as bacteria, yeasts, viruses, and cell components, for desalinization of protein solutions and other biological media, and for separating materials from ions, macromolecules, and biological molecules.

DETAILED DESCRIPTION OF PREFERRED EMBODIMENTS

In a preferred embodiment of the invention, the retentate spacers are arranged with inlets of various sizes to the open holes as external and/or internal retentate spacers or in a periodic sequence in the filter cassettes.

Rather surprisingly, it has been found that the cross-flow filter cassettes of the present invention have high filtration capacity in systems that have both high and low pumping capacity if the cassettes are connected to the leading and/or trailing end plates in such a way that, in the case of high pumping capacity, there is greater access to the open holes of the retentate spacer(s) that form the channels for the retentate discharge on the trailing side and, in the case of low pumping capacity, for the fluid feed intake on the leading side. Thus the cross-flow filter cassettes according to the present invention have asymmetric flow properties in two possible flow directions. This property may be exploited in terms of system technology by a flow reversal, for example during cleaning, in order to achieve optimal pressure relationships. Another possibility for utilizing these asymmetric flow properties consists of starting a cross-flow filtration system with low pressure and gradually increasing the pressure during the course of the filtration.

Figure 1:
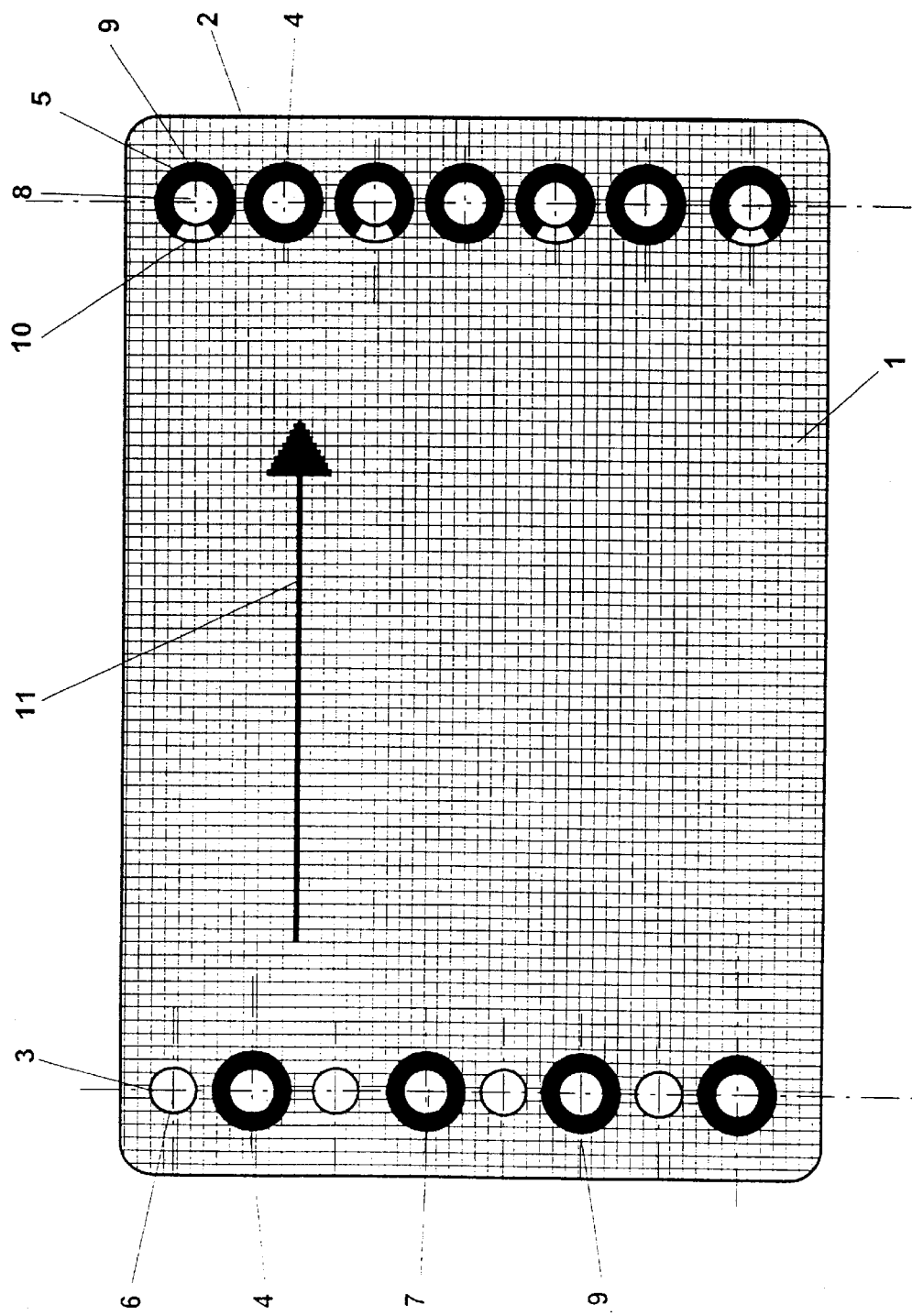
FIG. 1 is a plan view of an exemplary retentate spacer of the invention.

Turning to the drawings, wherein the same numerals designate like elements, there is shown in FIG. 1, a retentate spacer 2 made up of a fabric 1 and having holes 3, 4, 5. Holes 3 are open and form fluid feed channels 6, while holes 4 are open and form permeate discharge channel 7, and holes 5 are open and form retentate discharge channels 8. Open holes 3, 5 are connected so as to be in fluid communication with longitudinal flow channel or slit 15 (FIG. 3) formed through retentate spacer 2. Open holes 3 have greater access to feed channels 6 than do open holes 5 to retentate discharge channels 8. Closed holes 4 are enclosed in an elastomeric sealant 9, so applied as to form a smaller inlet 10 to open holes 5 that form retentate discharge channels 8, realized by application of elastomeric sealant 9 which for example partially encloses the periphery of open holes 5. For sealing against inelastic flat sheets or the adjoining protective frame or protective masks (not shown), elastomeric sealant compound 9 may extend slightly beyond the plane of retentate spacer 2. The fluid to be filtered presses through feed channels 6 via the greater inlets to open holes 3 in flow slit 15 (FIG. 3), which is built into the membranes adjacent retentate spacer 2, flows through the fabric 1 on both sides and leaves flow slit 15 through inlet 10 to open holes 3 opposite open holes 5 and is then led away via retentate discharge channels 8. The general flow direction of the fluid to be filtered is indicated by arrow 11. Part of the fluid penetrates membranes 13 adjacent retentate spacer 2, is collected in longitudinal flow channels or slits 16 (FIG. 3) and is then led away via open holes 4 that form permeate channels 7 in communication with permeate spacers 14 (FIG. 3).

By way of contrast there is shown a prior art retentate spacer 2' made up of a fabric 1, and likewise having holes 3, 4 5', wherein open holes 3 form feed channels 6, closed holes 4 form permeate channels 7, and open holes 5' form retentate discharge channels 8. But in this case open holes 3 and 5' are connected so as to communicate with flow slits 16 (FIG. 3) through prior art retentate spacer 2'. Open holes 3 and 5' have equal access to feed channels 6 and retentate discharge channels 8.

Figure 3:
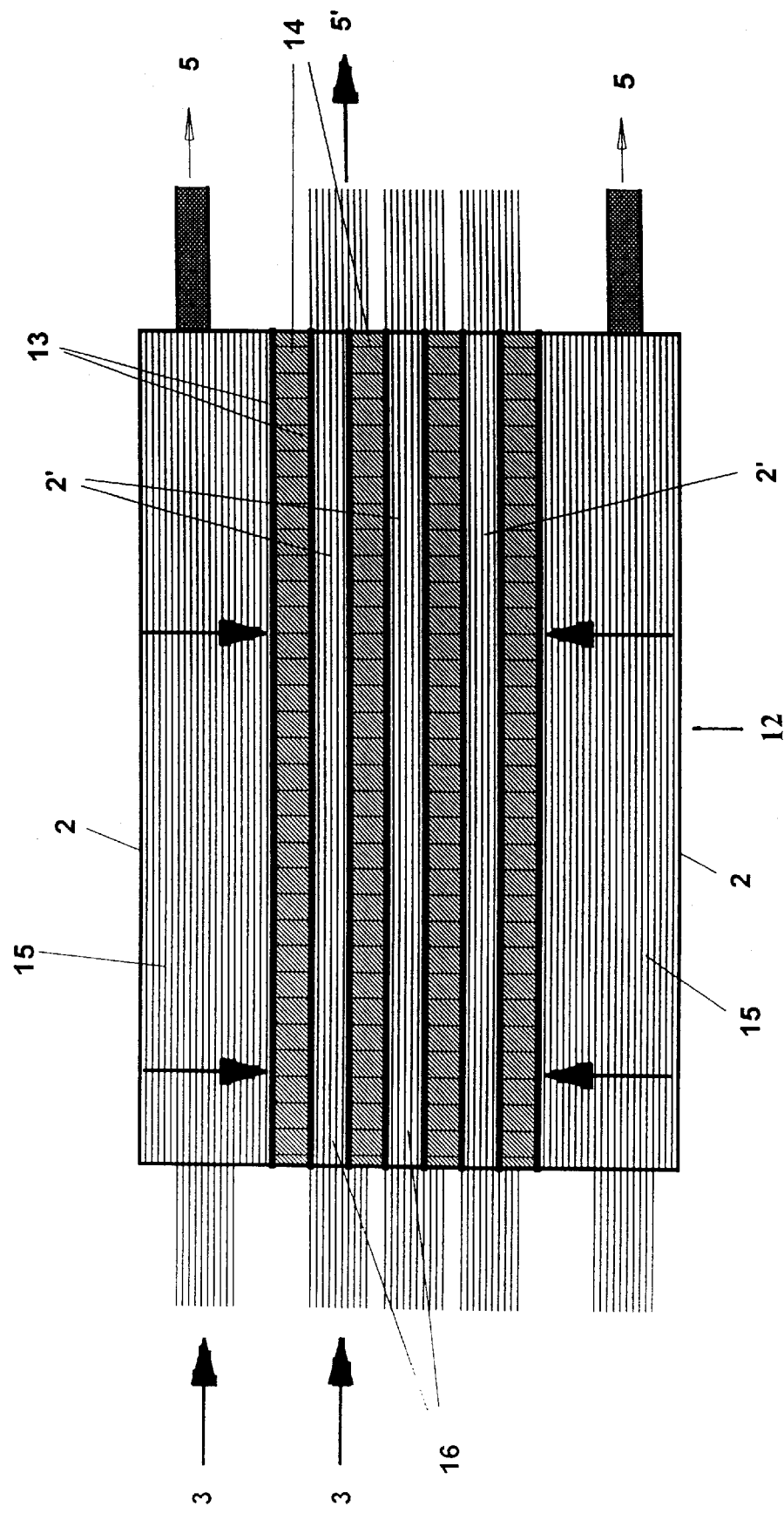
FIG. 3 is a schematic section through an exemplary cross-flow filter of the cassette.

FIG. 3 shows the structure of a preferred embodiment of the invention. Cross-flow filter cassette 12 consists of an upper and a loser external retentate spacer 2 of the invention and several internal prior art retentate spacers 2', membranes 13, and permeate spacers 14. In external retentate spacers 2 inlets to open holes 3 that form feed channels 6 are greater than inlets 10 (FIG. 1) to open holes 5 that form retentate discharge channels 8. Internal prior art retentate spacers 2' have equal access or inlets to open holes 3 and 5'. If the cross-flow filter cassette 12 is connected to the leading and/or trailing end plates in such a way that the greater access to the open holes 3 of the external retentate spacers 2 form the feed channels 6, a greater pressure differential arises in flow slit 15 than in the other flow slits 16, which have equal access to feed channels 6 and retentate discharge channels 8. Due to this higher pressure differential flow slit 15 expands, which in turn leads to the other flow slits 16 being narrowed, whereby the fluid flow-through rate increases, or with equal flow-through rates, a smaller amount of the fluid is necessarily pumped through the filter cassette per unit of time. This is indicated by the arrows shown in flow slits 15.

Figure 2:
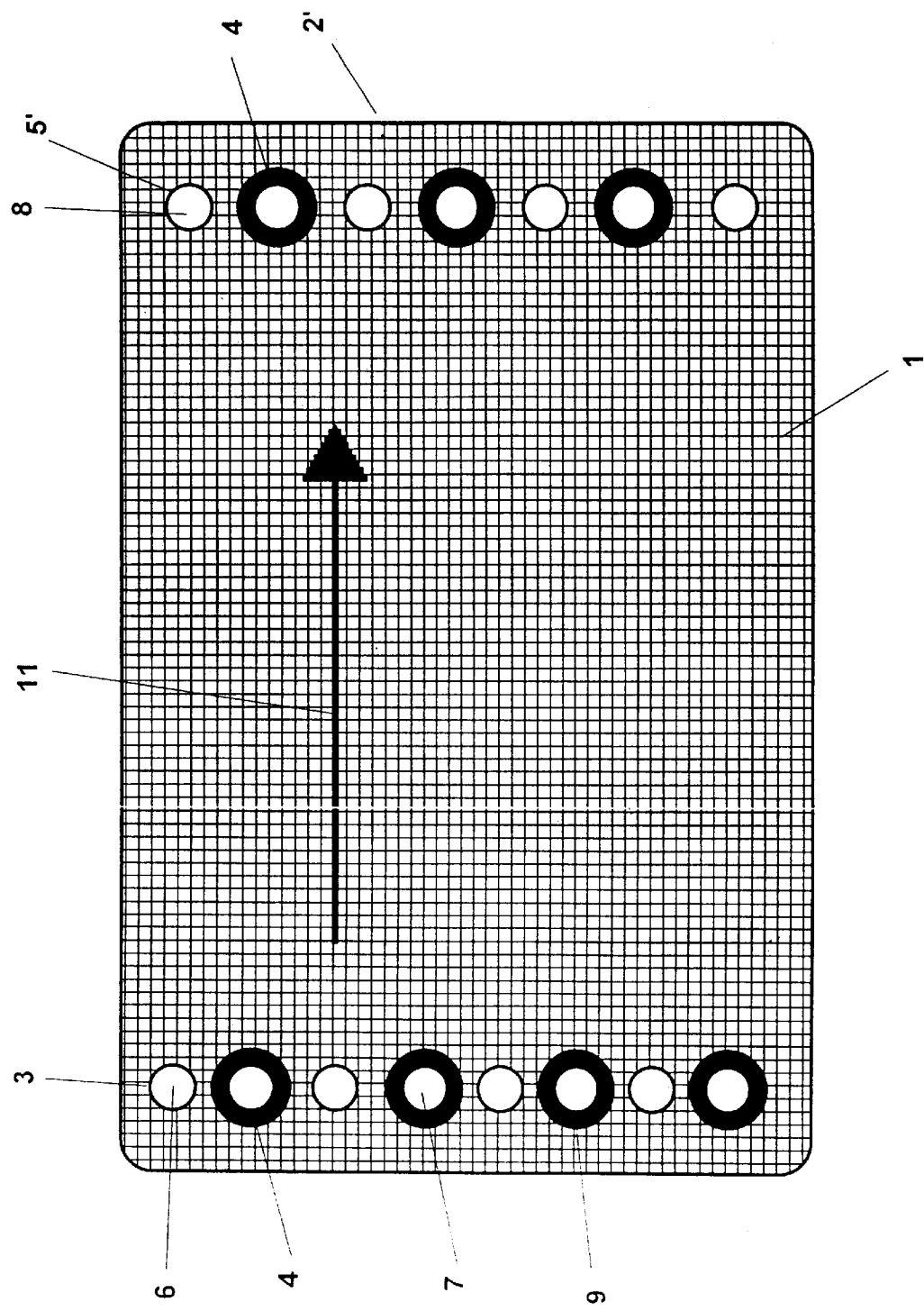
FIG. 2 is a plan view of a representative prior art retentate spacer.
Figure 4:
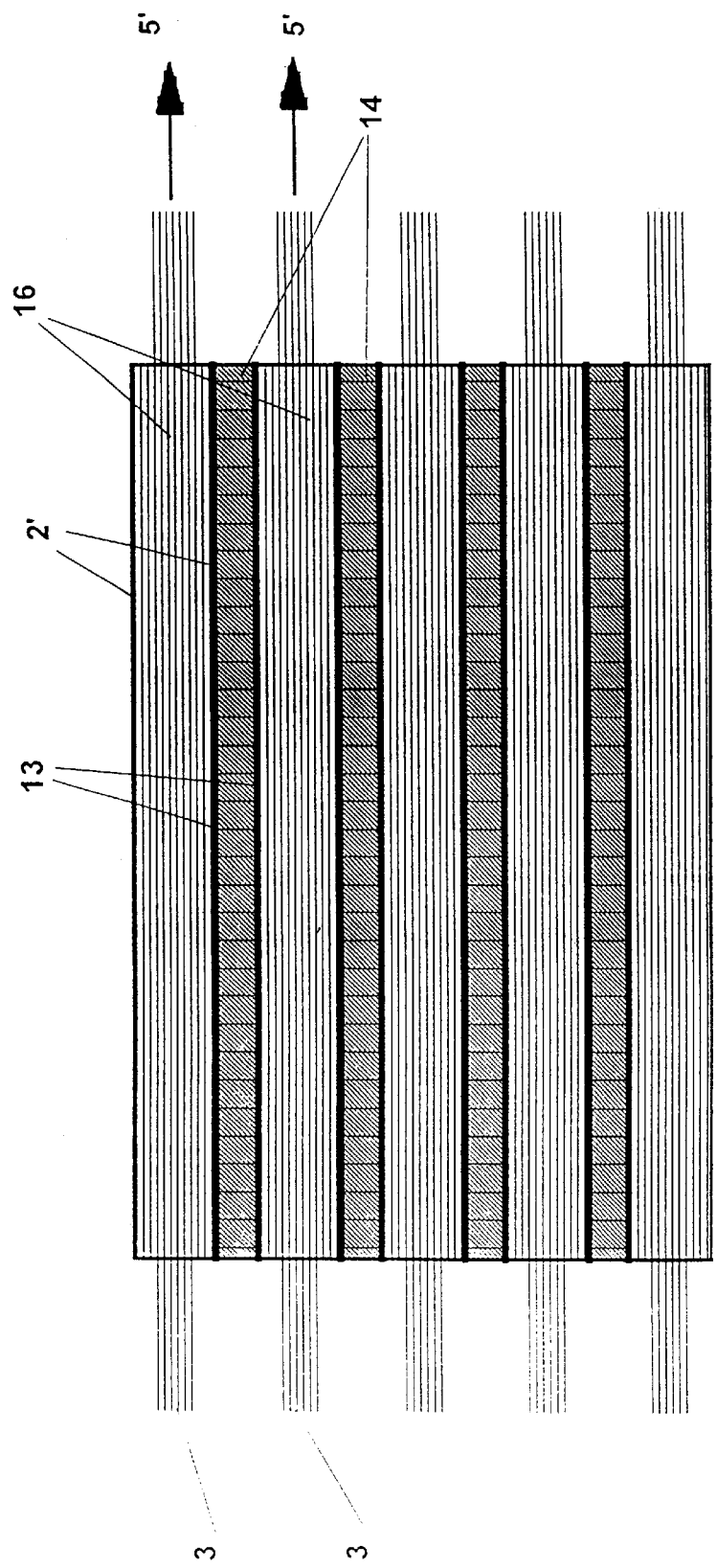
FIG. 4 is schematic section through a representative prior art cross-flow filter cassette.

In the prior art cross-flow filter cassettes shown schematically in FIG. 4 and utilizing the retentate spacers 2' shown in FIG. 2, equal pressure relationships prevail in all flow slits 15 and 16 due to the fact that inlets to open holes 3 and 5' are of equal size.

EXAMPLE 1

Filtration to concentrate an aqueous protein feed stream containing 5% albumin was performed with a Sartocon®-2 type (Sartorius AG) cross-flow filter cassette 12 of substantially the same configuration depicted in FIG. 3, consisting of 32 sheets of a 30,000 Dalton molecular weight cutoff ultrafiltration membrane of polyether sulfone having a total membrane surface area of 0.7 $m^2$, 16 filtrate spacers 14 and 15, a multiplicity of internal retentate spacers 2' and two external retentate spacers 2. By virtue of application of sealant 9 so as to restrict the inlet to holes 5 the two external retentate spacers 2 had about 20% less access 10 (FIG. 1) to open holes 5 forming retentate discharge channels 8 than the access to open holes 3 forming feed channels 6. To maintain an approximately uniform permeate stream, depending on the pressure difference between input and output pressures, the retentate flows given in Table 1 were maintained, while the trans-membrane pressure was kept at 2 bars.

TABLE 1

| Pressure difference* | 1 bar | 2 bars | 3 bars |
|---|---|---|---|
| Retentate flow (L/h · m$^2$) | 445.7 | 750 | 991.4 |
| Permeate flow (L/h · m$^2$) | 110.6 | 122.6 | 131.1 |

*Feed side pressure less retentate side pressure

Comparative Example A

Example 1 was repeated with the exception that all the retentate spacers were of the same prior art configuration as shown in FIG. 2 so that they all had equal inlets or access to holes 3 and 5' forming feed and retentate discharge channels 6 and 8, respectively. The data obtained are set forth in Table 2.

TABLE 2

| Pressure difference* | 1 bar | 2 bars | 3 bars |
|---|---|---|---|
| Retentate flow (L/h · m$^2$) | 800 | 1347.1 | 1821.4 |
| Permeate flow (L/h · m$^2$) | 113.1 | 126.9 | 132.9 |

*Feed side pressure less retentate side pressure

Figure 5:
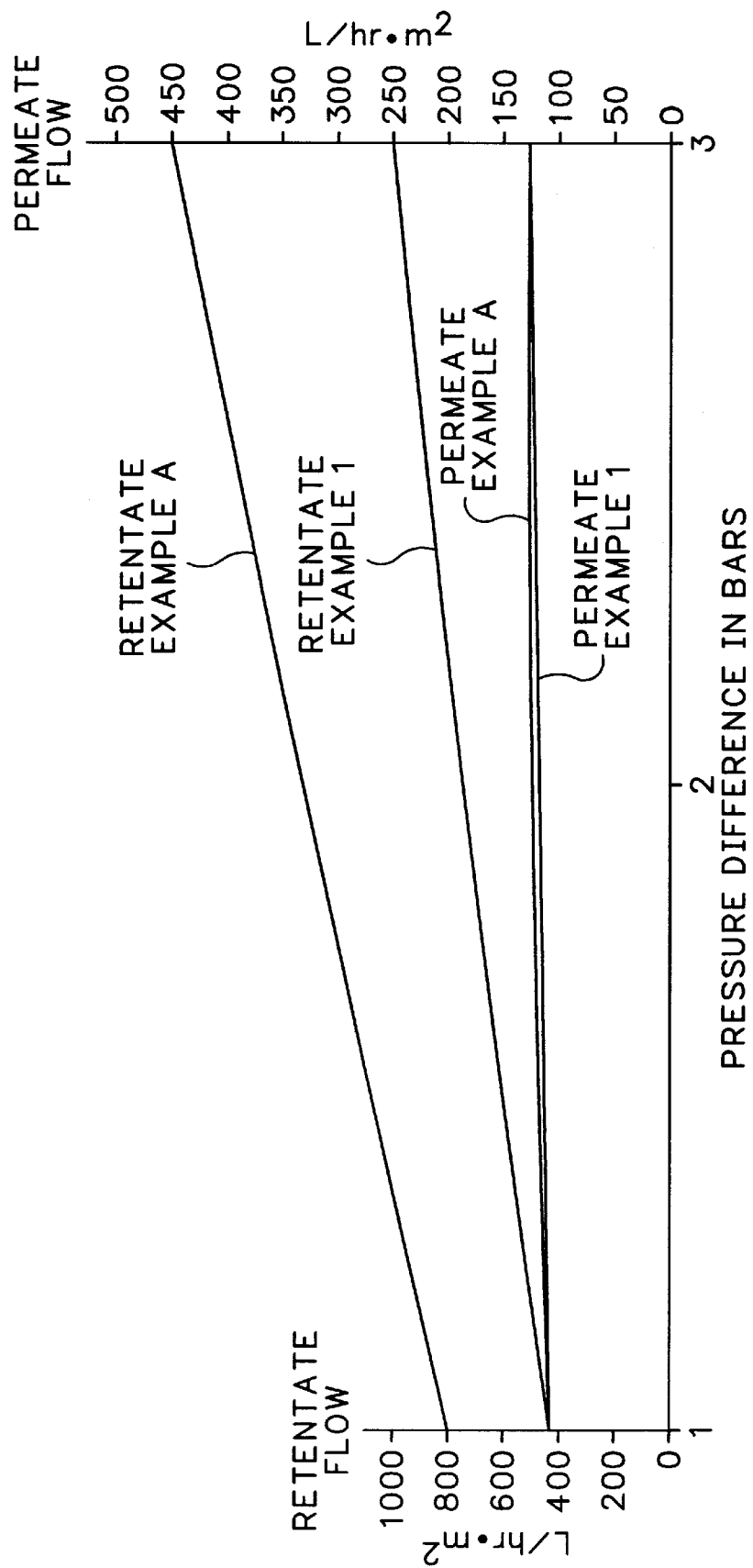
FIG. 5 is a graph of the flow of the retentate stream as a function of the pressure difference on the retentate side (input pressure less output pressure) with a steady state permeate stream volumetric flow.

FIG. 5 shows the results obtained from Example 1 and Comparative Example A graphically, wherein retentate flow is represented on the left ordinate in L/h·m$^2$ and the corresponding permeate flow is represented on the right ordinate. On the abscissa, the pressure difference is represented in bars. FIG. 5 shows that in order to achieve the same filtering power with the same pressure difference on the retentate side in comparison with a conventional cross-flow filter cassette, the cross-flow filter cassette of the invention only requires a retentate flow that is smaller by at least a factor of 1.8. This leads to a significant reduction in the energy needed for pumping to drive cross-flow filtration.

EXAMPLES 2–4

Filtration to concentrate an aqueous protein feed stream containing 5% albumin was performed with three cross-flow filters having the configuration shown in FIG. 3 with 1, 2 and 15 retentate spacers of the type depicted in FIG. 1 and located at various places in the cassette. The inlets to open holes 5 forming retentate channels 8 was about 20% less than the inlets to open holes 3 forming feed channels 6, as schematically depicted in 9, 10 of FIG. 1. All three cassettes were of the type used in Example 1, and consisted of 28 sheets of a 30,000-Dalton molecular weight cutoff ultrafiltration membrane of cross-linked cellulose hydrate (Hydrosart®, Sartorius AG), having a total membrane surface area of about 0.6 m$^2$, 14 filtrate spacers and 15 total retentate spacers.

Comparative Example B

The filtration of Examples 2–4 was repeated with the same cross-flow filtration cassette used therein with the exception that all retentate spacers were of the prior art type depicted in FIG. 2, wherein the inlets to open holes 3 and 5' was equal. The results are summarized in Table 3.

TABLE 3

| Example | Number of retentate spacers with reduced access | Position in cassette | Retentate flow (L/h · m$^2$) | Filtrate flow (L/h · m$^2$) |
|---|---|---|---|---|
| B | 0 | not present | 1340 | 100 |
| 2 | 1 | middle | 830 | 108 |
| 3 | 2 | above and below | 700 | 110 |
| 4 | 15 | throughout | 690 | 115 |

From Table 3 it is apparent that the following conclusions may be made:
  inclusion of a single inventive retentate spacer in a cassette yields the desired result (Example 2);
  making all of the retentate spacers in a filtration cassette of the inventive design does not adversely affect filtration (Example 4); and
  use of the retentate spacers of the invention results in a dramatic improvement in retentate flow and consequent reduction in pumping energy required relative to the use of no retentate spacer of the inventive design.

It should be understood that the present invention also contemplates the use of retentate spacers wherein the access to the open holes forming retentate outflow channels may be greater than the access to the open holes forming feed channels (useful in cleaning the filtration cassette by reverse flow flushing), as well as retentate spacers wherein the access to retentate discharge channels is greater or less than the access to the feed channels, depending upon the desired application and whenever a pressure differential in adjoining longitudinal flow channels is desirable.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In a cross-flow filter cassette comprising a multiplicity of adjacent filter cells wherein each cell consists of the elements (a) at least one retentate spacer forming a longitudinal flow channel for a fluid to be filtered, (b) a first membrane, (c) at least one permeate spacer forming a longitudinal permeate-collection channel, and (d) a second membrane wherein elements (a)–(d) have aligned holes forming three types of flow channels selected from (i) fluid feed channels, (ii) retentate discharge channels and (iii) permeate discharge channels, the improvement comprising the inclusion of at least one variable access retentate spacer wherein access to said aligned holes forming one type of flow channel is greater than the access to said aligned holes forming another type of flow channels.

2. The cross-flow filter cassette of claim 1 wherein said first and said second membranes are covered in their peripheral regions by protective frames that leave said aligned holes open.

3. The cross-flow filter cassette of claim 1 wherein said first and said second membranes are covered in their peripheral regions by protective ring masks that leave said aligned holes open.

4. The cross-flow filter cassette of any of claims 1–3 wherein said first and said second membranes are non-reinforced.

5. The cross-flow filter cassette of any of claims 1–3 wherein said at least one variable access retentate spacer is located outside said multiplicity of adjacent filter cells.

6. The cross-flow filter cassette of any of claims 1–3 wherein said at least one variable access retentate spacer is located within said multiplicity of adjacent filter cells.

7. The cross-flow filter cassette of any of claims 1–3 wherein said at least one variable access retentate spacer is arranged in said filter cassettes in a periodic sequence.

* * * * *